(12) United States Patent
Müller et al.

(10) Patent No.: US 6,494,982 B1
(45) Date of Patent: Dec. 17, 2002

(54) LAYERED COMPOSITE MATERIAL WITH AN INTERMEDIATE LAYER MADE FROM A THERMOPLASTIC

(75) Inventors: Klaus Müller, Sulzbach (DE); Klaus Klemm, Oberelsbach (DE)

(73) Assignee: Targor GmbH, Mainz (DE)

( * ) Notice: Subject to any disclaimer, the term of this patent is extended or adjusted under 35 U.S.C. 154(b) by 59 days.

(21) Appl. No.: 09/592,849

(22) Filed: Jun. 13, 2000

(30) Foreign Application Priority Data

Jun. 16, 1999 (DE) .......................................... 199 27 549

(51) Int. Cl.⁷ .......................... B32B 31/04; B32B 31/16; B32B 31/20; B32B 31/26; B32B 31/30
(52) U.S. Cl. ................... 156/306.6; 156/297; 156/299; 156/306.9; 156/308.2; 156/244.11; 156/244.27; 156/245
(58) Field of Search ............................... 428/203, 204, 428/480, 483, 523, 500; 442/50, 57, 58, 394, 395, 398; 156/306.6, 297, 299, 308.2, 244.11, 244.27, 306.9, 245

(56) References Cited

U.S. PATENT DOCUMENTS

| | | | | |
|---|---|---|---|---|
| 3,668,034 A | * | 6/1972 | Nicholas et al. | 156/242 |
| 5,000,809 A | * | 3/1991 | Adesko et al. | 156/230 |
| 5,055,346 A | * | 10/1991 | Rohrbacher | 428/216 |
| 5,139,854 A | * | 8/1992 | Johnson | 428/215 |
| 5,514,427 A | * | 5/1996 | Ellison et al. | 428/31 |
| 5,599,608 A | * | 2/1997 | Yamamoto et al. | 156/233 |
| 5,707,697 A | * | 1/1998 | Spain et al. | 428/208 |
| 5,928,778 A | * | 7/1999 | Takahashi et al. | 428/323 |
| 5,965,232 A | * | 10/1999 | Vinod | 428/85 |
| 6,025,069 A | * | 2/2000 | Eckart et al. | 428/332 |
| 6,040,044 A | * | 3/2000 | Takahashi et al. | 428/323 |

FOREIGN PATENT DOCUMENTS

| | | |
|---|---|---|
| DE | 197 22 339 A1 | 12/1998 |
| DE | 198 58 173 A1 | 6/2000 |
| FR | 2 673 575 | 9/1992 |

* cited by examiner

*Primary Examiner*—Vivian Chen
(74) *Attorney, Agent, or Firm*—Keil & Weinkauf

(57) ABSTRACT

A process for producing a composite material with an intermediate layer made from a thermoplastic polymer, an intermediate layer arranged thereupon, and a heat-cured layer applied to the intermediate layer, where the bonding material of the intermediate layer is a thermoplastic, the process comprising providing the materials for the intermediate layer, an optional decorative layer, and the heat-cured layer each in the form of a sheet, then bonding the sheets to the backing material at temperatures from 150 to 300° C. The intermediate layer and the backing may be composed of the same thermoplastic. The intermediate layer and the heat-cured layer may also be applied to both sides of the backing. The layered composite material may furthermore comprise a decorative layer between the intermediate layer and the heat-cured layer.

14 Claims, No Drawings

LAYERED COMPOSITE MATERIAL WITH AN INTERMEDIATE LAYER MADE FROM A THERMOPLASTIC

The present invention relates to a layered composite material comprising a backing made from a thermoplastic polymer, an intermediate layer arranged thereupon, and a heat-cured layer applied to the intermediate layer, where the bonding material of the intermediate layer is a thermoplastic. The present invention further relates to a process for producing this layered composite material and to its use for producing furniture, floorcoverings, wall paneling, household equipment or moldings in the electrical, construction or automotive industry.

The layered composite materials known hitherto are used in particular in the furniture industry and in the household equipment industry and essentially consist of a backing layer made from wood or from wood fibers or from individual sheets of paper press-molded with addition of resin, to which decorative layers, and also other heat-cured layers, known as overlays, are applied using heat and pressure. The decorative layers used here frequently have a woodgrain, metallic or marble pattern. In many cases the decorative layers are used together with the heat-cured layers applied thereto, in the form of laminates.

However, a disadvantage of layered composite materials of this type is that they are to some extent susceptible to moisture penetrating into the core layer from the edges, since both wood and wood fibers, and also individual sheets of paper, tend to swell when exposed to moisture. In addition, layered composite materials of this type are relatively difficult to shape.

For a wide variety of industrial applications, for example in the automotive or electrical industry, there is a need for surface materials which, on the one hand, have high compressive strength and, on the other hand, have comparatively high heat resistance, and which moreover can readily be produced with decorative effects.

Surface materials used for a long time in furniture production have two or more layers, including a backing layer, a decorative layer and a heat-cured layer lying thereupon. These layers, with the aid of other bonded layers, for example made from paper or from adhesive films, give a decorative layered composite material. However, a layered composite material of this type is very complicated to produce, frequently has a high formaldehyde content, and has disadvantageous swelling behavior.

DE-A 1 97 22 339 discloses a layered composite material which comprises a backing layer made from polypropylene, a decorative layer arranged thereupon and a heat-cured layer applied to the decorative layer. The earlier application DE-A 19 858 173 moreover describes a layered composite material made from a backing layer of various other thermoplastic polymers, for example certain styrene copolymers or polyoxymethylene or, respectively, polybutylene terephthalate, and also a decorative layer applied thereto and a heat-cured layer lying thereupon. Examples of features of layered composite materials of this type with a backing layer made from thermoplastic polymers are, when compared with conventional layered composite materials with backing layers made from wood, wood fibers or paper: high heat and moisture resistance, better mechanical strength and easier processing. However, a degree of stiffness and brittleness in the individual polymeric layers means that the layered composite materials known from DE-A 19 722 339 and DE-A 19 858 173 still have certain disadvantages in processing and shaping, in particular in three-dimensional shaping to give components for the automotive sector, the household sector or the electrical sector. In addition, layered composite materials of this type are sometimes also found to have unsatisfactory mechanical stability, attributable to a slight deficiency in adhesion between the backing layer and the decorative layer or, respectively, the heat-cured layer.

It is an object of the present invention to overcome the disadvantages described and to provide an improved layered composite material which, inter alia, can very easily be shaped in two or three dimensions and, due to high adhesion between the individual layers, has very high mechanical stability. This layered composite material should also be very easy to pigment.

We have found that this object is achieved by developing an improved layered composite material comprising a backing made from a thermoplastic polymer, an intermediate layer arranged thereupon, and a heat-cured layer applied to the intermediate layer, where the bonding material of the intermediate layer is a thermoplastic.

In one modification of the novel layered composite material, this may also comprise a decorative layer applied to the intermediate layer between the intermediate layer and the heat-cured layer. In the novel layered composite material it is also possible for an appropriate intermediate layer, a decorative layer arranged thereupon, if desired, and a heat-cured layer applied either to the intermediate layer or else to the decorative layer to be present on both sides of the backing made from the thermoplastic polymer, giving a sandwich structure with the backing layer in the middle.

The material of the backing may comprise based on the total weight of the backing, from 1 to 60% by weight, preferably from 5 to 50% by weight, particularly preferably from 10 to 40% by weight, of reinforcing fillers, such as barium sulfate, magnesium hydroxide or talc with an average particle size of from 0.1 to 10 $\mu$m, measured to DIN 66 115, wood, flax, chalk, glass fibers, coated glass fibers, long or short glass fibers, glass beads or mixtures of these. The material of the backing may also comprise the usual additives, such as stabilizers to protect against the action of light, UV radiation or heat, pigments, carbon blacks, lubricants, flame retardants, blowing agents and the like, in the amounts which are usual and required.

Examples of thermoplastic polymers which form the backing are polypropylene, polyethylene, polyvinyl chloride, polysulfones, polyether ketones, polyesters, polycycloolefins, polyacrylates and polymethacrylates, polyamides, polycarbonate, polyurethanes, polyacetals, such as polyoxymethylene, polybutylene terephthalates and polystyrenes. Both homopolymers and copolymers of these thermoplastic polymers may be used here. The backing layer preferably also comprises, besides the reinforcing fillers, polypropylene, polyoxymethylene, polybutylene terephthalate or polystyrene, in particular styrene copolymers with subordinate proportions of one or more comonomers, such as butadiene, α-methylstyrene, acrylonitrile, vinylcarbazole, or else esters of acrylic, methacrylic or itaconic acid. The backing of the novel layered composite material may also comprise recycled materials made from these thermoplastic polymers.

For the purposes of the present invention, polyoxymethylenes are homo- or copolymers of aldehydes, for example of formaldehyde, or of cyclic acetals, containing recurring carbon-oxygen bonds in the molecule and having a melt flow rate (MFR) to ISO 1133 of from 5 to 40 g/10 min, in particular from 5 to 30 g/10 min, at 230° C. with a load of 2.16 kg.

The polybutylene terephthalate preferably used is a higher-molecular-weight esterification product of terephthalic acid and butylene glycol with a melt flow rate (MFR) to ISO 1133 of from 5 to 50 g/10 min, in particular from 5 to 30 g/10 min, at 230° C. with a load of 2.16 kg.

Possible styrene copolymers are in particular copolymers having up to 45% by weight, preferably up to 20% by weight, of copolymerized acrylonitrile. Copolymers of this type made from styrene and acrylonitrile (SAN) have a melt flow rate (MFR) to ISO 1133 of from 1 to 25 g/10 min, in particular from 4 to 20 g/10 min, at 230° C. with a load of 2.16 kg.

Other styrene copolymers whose use is likewise preferred contain up to 35% by weight, in particular up to 20% by weight, of copolymerized acrylonitrile and up to 35% by weight, in particular up to 30% by weight, of copolymerized butadiene. The melt flow rate of copolymers of this type made from styrene, acrylonitrile and butadiene (ABS) to ISO 1133 is from 1 to 40 g/10 min, in particular from 2 to 30 g/10 min, at 230° C. with a load of 2.16 kg.

Other materials used for the backing are in particular polyolefins, such as polyethylene or polypropylene, preferably the latter. For the purposes of the present invention, polypropylenes are homo- or copolymers of propylene. Copolymers of propylene contain subordinate amounts of monomers copolymerizable with propylene, for example $C_2$–$C_8$-1-alkenes, such as ethylene, 1-butene, 1-pentene or 1-hexene. It is also possible to use two or more different comonomers.

Examples of particularly suitable backing materials are propylene homopolymers or propylene copolymers having up to 50% by weight of other copolymerized 1-alkenes having up to 8 carbon atoms. The propylene copolymers here are random copolymers or block or impact copolymers. If the propylene copolymers have a random structure they generally contain up to 15% by weight, preferably up to 6% by weight, of other 1-alkenes having up to 8 carbon atoms, in particular ethylene, 1-butene or a mixture of ethylene and 1-butene.

Block or impact copolymers of propylene are polymers resulting from a two-stage preparation in which a propylene homopolymer or a random propylene copolymer having up to 15% by weight, preferably up to 6% by weight, of other 1-alkenes having up to 8 carbon atoms is first prepared. Onto this is then polymerized a propylene-ethylene copolymer with an ethylene content of from 15 to 80% by weight. The propylene-ethylene copolymer may also contain other $C_4$–$C_8$-1-alkenes. The amount of the propylene-ethylene copolymer polymerized on generally gives the final product a content of from 3 to 60% by weight of the copolymer produced in the second stage.

The polymerization to prepare polypropylene may use a Ziegler-Natta catalyst system. Catalyst systems of this type used here are in particular those which have, in addition to a titanium-containing solid component a), cocatalysts in the form of organic aluminum compounds b) and electron-donor compounds c).

It is, however, also possible to use catalyst systems based on metallocene compounds or, respectively, based on metal complexes which are active in polymerization.

Specifically, conventional Ziegler-Natta catalyst systems comprise a titanium-containing solid component, inter alia halides or alcoholates of tri- or tetravalent titanium, together with a halogen-containing magnesium compound, inorganic oxide backings, such as silica gel, and also electron-donor compounds. These are in particular carboxylic derivatives, ketones, ethers, alcohols or organosilicon compounds.

The titanium-containing solid component may be prepared by methods known per se. Examples of these are described, for example, in EP-A 45 975, EP-A 45 977, EP-A 86 473, EP-A 171 200, GB-A 2 111 066, U.S. Pat. Nos. 4,857,613 and 5,288,824. The process disclosed in DE-A 195 29 240 is preferably used.

Suitable aluminum compounds b) other than trialkylaluminum compounds are those in which one alkyl group has been replaced by an alkoxy group or by a halogen atom, for example by chlorine or bromine. The alkyl groups may be identical or different. Linear or branched alkyl groups are possible. Preference is given to the use of trialkylaluminum compounds each of whose alkyl groups has from 1 to 8 carbon atoms, for example trimethylaluminum, triethylaluminum, triisobutylaluminum, trioctylaluminum or methyldiethylaluminum, or mixtures of these.

Besides the aluminum compound b), electron-donor compounds c) are generally used as another cocatalyst. Examples of these are mono- or polyfunctional carboxylic acids, carboxylic anhydrides and carboxylic esters, and also ketones, ethers, alcohols, lactones, organophosphorus compounds and organosilicon compounds. These electron-donor compounds c) may be identical with or differ from the electron-donor compounds used to prepare the titanium-containing solid component a).

Other compounds which may be used to prepare polypropylene, instead of Ziegler-Natta catalyst systems, are metallocene compounds or, respectively, metal complexes which are active in polymerization.

For the purposes of the present invention, metallocenes are complex compounds made from metals of transition groups of the Periodic Table with organic ligands, and these together with metallocenium-ion-forming compounds give effective catalyst systems. When used to prepare polypropylene the metallocene complexes in the catalyst system are generally in the form of a backing. Backings frequently used are inorganic oxides, but it is also possible to use organic backings in the form of polymers, for example polyolefins. Preference is given to the inorganic oxides described above which are also used to prepare the titanium-containing solid component a).

The central atoms present in metallocenes usually used are titanium, zirconium or hafnium, preferably zirconium. The central atom usually has bonding via a $\pi$ bond to at least one, generally a substituted, cyclopentadienyl group, and also to other substituents. The other substituents may be halogens, hydrogen or organic radicals, preferably fluorine, chlorine, bromine or iodine or a $C_1$–$C_{10}$-alkyl group. The cyclopentadienyl group may also be a constituent of an appropriate heteroaromatic system.

Preferred metallocenes contain central atoms which have bonding via two identical or different $\pi$ bonds to two substituted cyclopentadienyl groups, and particular preference is given to those in which there are substituents of the cyclopentadienyl groups bonded to both cyclopentadienyl groups. Particular preference is given to complexes whose substituted or unsubstituted cyclopentadienyl groups also have substitution by cyclic groups on two adjacent carbon atoms, and the cyclic groups may also have been integrated into a heteroaromatic system.

Other preferred metallocenes have only one substituted or unsubstituted cyclopentadienyl group which, however, contains at least one substituent which also has bonding to the central atom.

Examples of suitable metallocene compounds are
ethylenebis(indenyl)zirconium dichloride,
ethylenebis(tetrahydroindenyl)zirconium dichloride,
diphenylmethylene-9-fluorenylcyclopentadienylzirconium
  dichloride, dimethylsilanediylbis(3-tert-butyl-5-methylcyclopentadienyl)-zirconium dichloride,
dimethylsilanediyl(2-methyl-4-azapentalene) (2-methyl-4 (4'-methylphenyl)indenyl)zirconium dichloride,
dimethylsilanediyl(2-methyl-4-thiapentalene) (2-ethyl-4(4'-tert-butylphenyl)indenyl)zirconium dichloride,
ethanediyl(2-ethyl-4-azapentalene) (2-ethyl-4(4'-tert-butylphenyl)indenyl)zirconium dichloride,
dimethylsilanediylbis(2-methyl-4-azapentalene)zirconium dichloride,
dimethylsilanediylbis(2-methyl-4-thiapentalene)zirconium dichloride,
dimethylsilanediylbis(2-methylindenyl)zirconium dichloride,
dimethylsilanediylbis(2-methylbenzindenyl)zirconium dichloride,
dimethylsilanediylbis(2-methyl-4-phenylindenyl)zirconium dichloride,
dimethylsilanediylbis(2-methyl-4-naphthylindenyl) zirconium dichloride,
dimethylsilanediylbis(2-methyl-4-isopropylindenyl) zirconium dichloride or
dimethylsilanediylbis(2-methyl-4,6-diisopropylindenyl) zirconium dichloride and also the corresponding dimethylzirconium compounds.

The metallocene compounds are known or obtainable by methods known per se. Other catalysts which may be used are mixtures of metallocene compounds of this type, and also the metallocene complexes described in EP-A 416 815.

The metallocene catalyst systems also comprise metallocenium-ion-forming compounds. Suitable compounds are strong, neutral Lewis acids, ionic compounds with Lewis-acid cations and ionic compounds with Bronsted acids as cation. Examples of these are tris (pentafluorophenyl)borane, tetrakis(pentafluorophenyl) borate or salts of N,N-dimethylanilinium. Other suitable metallocenium-ion-forming compounds are open-chain or cyclic aluminoxane compounds. These are usually prepared by reacting trialkylaluminum with water and are generally mixtures of linear and cyclic chain molecules of different lengths.

The metallocene catalyst systems may also comprise organometallic compounds of the metals of the 1st, 2nd or 3rd main group of the Periodic Table, for example n-butyllithium, n-butyl-n-octylmagnesium, triisobutylaluminum, triethylaluminum or trimethylaluminum.

The polypropylenes which are used for the backing layer are prepared by polymerization in at least one reaction zone, and also frequently in two or more reaction zones arranged in series (reactor cascade), in the gas phase, in suspension or in the liquid phase (bulk phase). The reactors used may be those usual for polymerizing $C_2$–$C_8$-1-alkenes. Examples of suitable reactors are continuous stirred-tank reactors, loop reactors and fluidized-bed reactors. The size of the reactors is of no significant importance in this context and depends on the output to be achieved in each reaction zone.

The reactors used are in particular fluidized-bed reactors, and also horizontally or vertically agitated powder-bed reactors. The reaction bed for the process according to the invention is generally composed of the polymer made from $C_2$–$C_8$-1-alkenes polymerized in the respective reactor.

The polypropylenes used as backing layers are prepared by polymerization under conventional reaction conditions at from 40 to 120° C., in particular from 50 to 100° C., and at pressures of from 10 to 100 bar, in particular from 20 to 50 bar.

The polypropylenes used as backing generally have a melt flow rate (MFR) to ISO 1133 of from 0.1 to 200 g/10 min, in particular from 0.2 to 100 g/10 min, at 230° C. with a load of 2.16 kg.

The backing used in the novel layered composite material may also be a blend, i.e. a mixture of different thermoplastic polymers, for example a blend made from a styrene copolymer with acrylonitrile and from a copolymer made from butadiene and acrylonitrile.

According to the invention the layered composite material also comprises a bonding layer made from a thermoplastic, preferably from the thermoplastic also used for the backing, as an intermediate layer between the backing and the heat-cured layer. This in particular improves the adhesion between backing and intermediate layer. The intermediate layer is in particular a thin film or else a thin nonwoven web of a thickness from 0.001 to 1.0 mm, in particular from 0.005 to 0.3 mm. Possible materials for the intermediate layer are the thermoplastics also described above for the backings, i.e. in particular polypropylene and polyethylene, styrene polymers, polyoxymethylene or polybutylene terephthalate.

Another intermediate layer whose use is preferred is a resin-saturated nonwoven web or a resin-saturated film made from a thermoplastic. Resins used for this are in particular acrylate resins, phenolic resins, urea resins or melamine resins. The degree of resinification here may be up to 300%, meaning that practically the entire surface of the intermediate layer has multiple coatings of resin. The degree of resinification is preferably from 50 to 150%, in particular from 80 to 120%. The weight per $m^2$ of the intermediate layer is from 15 to 150 g, in particular from 30 to 60 g.

In a preferred embodiment the novel layered composite material may also have a decorative layer arranged on the intermediate layer, between the intermediate layer and the heat-cured layer.

The decorative layer may be composed of a plastic which has an embossment or a coloration, or both combined, and may be a ready-to-use laminate, for example. However, the decorative layer may also be composed of paper or of a fabric or of a paper-like or fabric-like or wood-like or metal-like material. Examples of these would be decorative layers made from an aluminum-like material or from a stainless-steel-like material, or else from leather-like, silk-like, wood-like, cork-like or linoleum-like material. The decorative layer may also have been resinified with acrylic resins, phenolic resins, urea resins or melamine resins, in which case the degree of resinification may be from 50 to 300%, in particular from 100 to 300%, based on the weight of the decorative layer. The weight of the decorative layer is usually from 10 to 200 g/$m^2$, in particular from 30 to 150 g/$m^2$ and particularly preferably from 50 to 130 g/$m^2$.

The heat-cured layer (overlay) arranged upon the decorative layer is preferably composed of a thermoset plastic, for example of a paper saturated with acrylic resin, with phenolic resin, with melamine resin or with urea resin, crosslinked by exposure to pressure or heat during the production of the layered composite material. The weight of the heat-cured layer (overlay) is usually from 10 to 300 g/$m^2$, in particular from 15 to 150 g/$m^2$ and particularly preferably from 20 to 70 g/$m^2$.

For the arrangement of the heat-cured layer (overlay) on the intermediate layer, on one or, if desired, on both sides, it is also possible to use a ready-to-use laminate. It is also possible to apply a ready-to-use laminate, composed of the decorative layer and the overlay, to the intermediate layer. Ready-to-use laminates of this type are known per se and are obtainable, inter alia, from Melaplast in Schweinfurt, Germany.

The total thickness of the novel layered composite material is from 1 mm to 100 mm, preferably from 1 to 20 mm, in particular from 1.5 to 10 mm, and the backing accounts for at least 80%, preferably at least 90%, of the total thickness.

The novel layered composite materials may be prepared by a process in which the materials for the intermediate layer, the decorative layer, if used, and the heat-cured layer are in the form of thin sheets in each case and are then bonded at from 150 to 300° C., in particular from 160 to 280° C., to the material for the backing. The intermediate layer, the decorative layer, if used, and the heat-cured layer (overlay) may also preferably be used here combined as a ready-to-use laminate, which is likewise a sheet.

It is also possible for the intermediate layer, the decorative layer, if used, and the heat-cured layer first to be bonded to one another by dipping into a bath of adhesive or by using thin adhesive strips in a press, preferably in a double belt press, and then applying this composite to the backing. It can also be advisable here for the composite made from intermediate layer, decorative layer, if used, and heat-cured layer first to be shaped in two dimensions by a thermoforming process or, respectively, by direct shaping, for example in an injection mold, and then combined, by in-mold coating, extrusion or hot-press molding, with the thermoplastic which is to form the backing. If the backing and intermediate layer here are composed of identical thermoplastics, the adhesion between the two layers is very high.

The process for producing the novel layered composite material may also be modified by shaping the layered composite material in three dimensions after a preceding heat treatment at from 150 to 300° C., in particular from 150 to 250° C. and particularly preferably from 160 to 200° C. This method can give, for example, moldings for the electrical, construction or automotive industry.

It is also possible to use conventional plastics industry processing methods to produce the novel layered composite material, by bonding the heat-cured layer with the intermediate layer, the decorative layer, if used, and the backing. Examples of these conventional processing methods are injection molding, extrusion and hot-press molding of the individual layers.

In injection molding, the individual layers, i.e. the backing, the intermediate layer, the decorative layer, if used, and the heat-cured layer (or the two latter layers together in the form of a ready-to-use laminate) are either shaped directly in advance by way of a thermoforming process and then in-mold coated with one another in an injection mold, or else are directly shaped and in-mold coated with one another only once they are in the injection mold. This may be done either on one side or on both sides, and in the latter case the arrangement has the intermediate layer, the decorative layer, if used, and the heat-cured layer on both sides of the backing. This injection molding procedure usually takes place at from 150 to 300° C., in particular at from 180 to 280° C., preferably at from 190 to 270° C., and at pressures of from 50 to 100 N/cm$^2$, in particular from 60 to 80 N/cm$^2$. The temperatures and pressures arising in the injection mold achieve both very good bonding of the thermoplastic intermediate layer to the thermoplastic backing and also further curing of the novel layered composite material. Compared with the layered composite materials known hitherto, this material is very flexible and is easy to shape in subsequent processing steps.

In the extrusion process the intermediate layer, the decorative layer, if used, and the heat-cured layer of the novel layered composite material are bonded to one another by being fed to one or both sides of the thermoplastic backing by way of temperature-controlled calender rolls or embossing rolls (a process known as lamination). The temperatures usually used here are from 150 to 300° C., in particular from 160 to 250° C., preferably from 170 to 220° C., and the pressures are from 40 to 200 N/cm$^2$, in particular from 50 to 100 N/cm$^2$. This gives very good adhesion of the individual sheets to one another. The resultant layered composite material also has good surface properties.

One version of the extrusion process is that known as profile extrusion. In this, the individual layers of the novel layered composite material, in particular the intermediate layer, are shaped by a calibrating unit in such a way that these can then be fed directly onto the actual profile, i.e. the backing made from a thermoplastic.

It is also possible to obtain the novel layered composite material by hot-press molding of the individual layers. These may either be shaped in advance by an upstream thermoforming process or else directly within the press. This is done by feeding pellets of thermoplastic directly onto a laminated composite made from the intermediate layer, the decorative layer, if used, and the heat-cured layer and hot-press molding this combination at from 150 to 300° C., in particular from 160 to 250° C., preferably from 170 to 230° C., and at a pressure of from 50 to 120 N/cm$^2$, in particular from 80 to 100 N/cm$^2$, with press times of from 0.5 to 10 minutes, in particular from 1 to 5 minutes and particularly preferably from 1 to 3 minutes.

The surface of the layered composite materials obtained in this manner may also be pigmented.

The novel layered composite materials have, inter alia, good mechanical properties due to the good adhesion between the individual layers. They are easy to shape in two or three dimensions and also have high resistance to high temperatures and to chemicals.

The novel layered composite materials are suitable, inter alia, for producing furniture, floorcoverings, wall paneling or household equipment, or moldings in the electrical, construction or automotive industry.

The examples below are intended to describe the invention in further detail. The following test methods were used in the working examples:

behavior on exposure to steam was determined to EN 438-2.24;

abrasion resistance was determined to EN 438-2.6 at 6000 to 10,000 U/min;

compressive strength was determined by the falling ball test to EN 438 with an 8 mm backing plate, size of impression: 5.5 mm;

resistance to the heat of a cigarette was determined to EN 438-2.18;

chemicals resistance was determined to DIN 51958;

scratch resistance was determined to ISO 1518;

bond strength was determined by using a razor blade to make cruciform parallel cuts (crosscuts) into the surface of a molding. An adhesive tape was then pressed onto the cut surface and then vigorously pulled off from the surface at an angle perpendicular to the same. If virtually no segments were removed from the surface with the adhesive tape, the bond strength was graded "+"; if individual segments amounting up to 10% of the total coverage could be pulled away, the result was graded "±" and if more than 10% of the entire surface could be pulled away the result was graded "−". Particularly good bond strengths were graded "++".

EXAMPLE 1

A propylene homopolymer reinforced with 20% by weight of talc and with a melt flow rate (MFR) to ISO 1133, of 15 g/10 min at 230° C. with 2.16 kg was heated to 260° C. and injected at an injection pressure of 80 N/cm² into a shallow injection molding chamber into which an intermediate layer of synthetic polymeric nonwoven web made from the same propylene homopolymer, and also a ready-to-use laminate, had previously been inserted. The ready-to-use laminate was composed of a decorative film made from resin-saturated paper and of a heat-cured layer (overlay), likewise made from resin-saturated paper. The mold was cooled within a period of 0.5 min to a temperature of 50° C. while maintaining a holding pressure of 80 N/cm², then the injection molding chamber was opened and the resultant layered composite material removed. The results of tests on the layered composite material are given in the table below.

EXAMPLE 2

Example 1 was repeated under similar conditions with the same ready-to-use laminate, but the material for the backing and the synthetic polymeric nonwoven web intermediate layer was an unreinforced propylene homopolymer with a melt flow rate (MFR) to ISO 1133 of 15 g/10 min at 230° C. with 2.16 kg. The propylene homopolymer was heated to 250° C., injected at an injection pressure of 70 N/cm² into a shallow injection molding chamber and, as in Example 1, bonded to the synthetic polymeric nonwoven web and the ready-to-use laminate.

Comparative Example A

Example 1 was repeated under similar conditions and using the same propylene homopolymer as backing, and also using the same ready-to-use laminate, but the nonwoven web intermediate layer used was now a resin-saturated paper. The results of tests on the resultant layered composite material are listed in the table below.

The table shows that, when compared with the layered composite materials known from the prior art, the novel layered composite materials which have an intermediate layer made from a thermoplastic have, inter alia, higher mechanical stability, i.e., higher compressive strength, and also higher abrasion resistance and adhesion. The novel layered composite materials are also easy to shape in two or three dimensions.

TABLE

|  | Examples | | Comparative Example |
| --- | --- | --- | --- |
|  | 1 | 2 | A |
| Behavior in steam | nc | nc | nc |
| Abrasion resistance rpm | >8000 | >8000 | 8000 |
| Compressive strength | <0.5 mm | <0.5 mm | <6.0 mm |
| Cigarette resistance | nc | nc | nc |
| Chemical resistance | nc | nc | nc |
| Scratch resistance | >30 N | >30 N | >30 N |
| Bond strength | + + | + + | + |
| Temperature change from −40° C. to +120° C. | nc | nc | nc | nc: no change

We claim:

1. A process for producing a layered composite material having a backing made from a thermoplastic polymer, an intermediate layer arranged on the backing, and a heat-cured layer applied to the intermediate layer, wherein the bonding material of the intermediate layer is a thermoplastic, which comprises providing the materials for the intermediate layer, a decorative layer, if used, and the heat-cured layer in the form of sheets in each case and then bonding the sheets at from 150 to 300° C. to the material for the backing.

2. The process claimed in claim 1, wherein the layered composite material is shaped in three dimensions after a preceding heat treatment at from 150 to 300° C.

3. The process claimed in claim 1, wherein injection molding is used to bond the heat-cured layer with the intermediate layer, the decorative layer, if used, and the backing.

4. The process claimed in claim 1, wherein extrusion is used to bond the heat-cured layer with the intermediate layer, the decorative layer, if used, and the backing.

5. The process claimed in claim 1, wherein hot-press molding is used to bond the heat-cured layer with the intermediate layer, the decorative layer, if used, and the backing.

6. The process claimed in claim 1, wherein the layered composite has a total thickness of from 1 to 100 mm and wherein the backing accounts for at least 80% of the total thickness of the layered composite.

7. The process claimed in claim 1, wherein the layered composite comprises the decorative layer between the intermediate layer and the heat-cured layer.

8. The process claimed in claim 7, wherein the decorative layer is composed of a plastic or of paper which has an embossment or a coloration or both combined.

9. The process claimed in claim 1, wherein the intermediate layer and the backing are composed of the same thermoplastic.

10. The process claimed in claim 9, wherein the intermediate layer is composed of polypropylene, polystyrene, polybutylene terephthalate or polyoxymethylene.

11. The process claimed in claim 10, wherein the intermediate layer is a film or a non-woven web.

12. The process claimed in claim 11, wherein the nonwoven web of the intermediate layer is resin saturated, the resin being selected from the group consisting of acrylate resins, phenolic resins, urea resins and melamine resins.

13. The process claimed in claim 1, wherein the backing additionally comprises an amount of from 1.0 to 60% by weight, based on the total weight of the backing, of reinforcing material, said reinforcing material being composed of barium sulfate, magnesium hydroxide, talc, wood, flax, chalk, glass fibers or glass beads.

14. The process claimed in claim 1, wherein the heat-cured layer is composed of a thermoset plastic which is crosslinked by exposure to pressure or heat during the production of the layered composite material.

* * * * *